Patented July 17, 1934

1,966,997

UNITED STATES PATENT OFFICE 1,966,997

PROCESS OF PRODUCING ARTIFICIAL WOOD

Stefan Schless, Grodig, near Salzburg, Austria

No Drawing. Application November 5, 1930, Serial No. 493,699. In Austria November 14, 1929

7 Claims. (Cl. 18—47.5)

This invention relates to a process of producing an artificial wood, which can be stained, polished and treated in the same way as natural wood, and which closely resembles the latter. The artificial wood, produced according to the present invention, is particularly adapted for use in connection with inlaid floors, wall-coverings, panes, furniture, and so forth. The finished product is water-proof, heat-resistant and fire-proof; it does not shrink, warp, bend or crack. It can be turned on a lathe, bored, milled, planed and cut. It is suited for any kind of colour, mordants, oil-paints and varnish colours, and completely absorbs the same.

The essential feature of the present invention consists in mixing pulverulent calcium oxide or calcium hydroxide with pulverulent silica and cellulose or other organic fibrous materials or wood-meal or wood-dust, moistening the mixture with such small quantities of water that it remains felt-like and allowing it to stand for some time in this condition. The fibrous material absorbs the moisture, so that the mixture may be readily pressed.

The silica may be used for instance in the form of infusorial earth or ground quartz. Cellulose, especially wood-cellulose, sawdust, wood-meal or wood-dust can be used as fibrous materials. The mixture may consist for instance of silica 40%, calcium oxide 30% and fibrous material 30%.

The mixture which has to be pressed is first brought into a felt-like and loose condition by a suitable device and is next placed or blown into a chamber. A blower may be used for this purpose, similar to those used in the manufacture of felt bats, where cleaned and loosened wool is blown into a chamber and is deposited on the floor of the latter. According to the present invention the felt-like loosened material of artificial wood is blown into a chamber by means of a blower. The material settles down on the floor of the said chamber and is then pressed, whereby the fibres interlock with one another with the result of yielding a compressed mass of cardboard-like structure. Now the compressed mass is placed into a drying chamber and subjected to a gradually increasing temperature up to 110 degrees centigrade. The material may thus be treated for about ten hours, whereby it is dried and the lime is bound with the silica. By this treatment, the material is already hardened to such an extent that it can be placed in an upright condition in a chamber continuously supplied with carbonic acid, where it is treated with the latter at ordinary or raised temperature. The carbonic acid is taken up by the lime, thereby forming carbonate of lime, which completely joins together the fibres of the fibrous material. This treatment by carbonic acid may be of various duration. It may generally extend approximately from 24 hours to several days.

The material thus produced is finished according to requirement by treating it with oil, impregnating means or polish.

For several purposes it is desirable to produce artificial wood consisting of two or more layers in which these layers are of different composition and in consequence thereof of different specific weight and structure. Plates of this sort of any thickness can be produced. These plates are very resistant against pressure and shocks; they do not warp and remain quite smooth and straight even when stored in damp rooms.

A blower comprising a chamber with two blowing devices, the latter passing into the upper part thereof, is preferably used for carrying out this modified process. By means of one of the said blowing devices an artificial wood material, of which one cubic metre weighs say 1000 kilograms consisting of a loosened mixture of pulverulent calcium oxide or calcium hydroxide, pulverulent silica and cellulose or other fibrous material or wood-meal or wood-dust and which is in a felt-like loosened condition, is blown into the chamber, and after this material has settled down on the floor of the said chamber another material is blown in, of which a cubic metre weighs say 1500 kilograms and which also consists of a loosened mixture of the above stated nature.

When making an artificial wood plate of a thickness of 5 mms., for instance first a layer is deposited on the floor of the above-mentioned chamber by blowing into the latter a material of the described nature, the weight of which per cubic metre is 1500 kilograms. Subsequently a material is blown in, the weight of which per cubic metre is 1000 kilograms. To this layer is super-imposed a layer of a weight of 1500 kilograms per cubic metre and to this again a layer of a weight of 1000 kilograms and finally to the latter layer is superimposed a layer with a weight of 1500 kilograms per cubic metre. The different specific weights of the materials to be blown in is attained in a most simple manner by employing different quantities of pulverulent materials and fibrous materials.

The duration of the blowing depends on the desired thickness of the plates. Also three or more blowing devices may be employed, whereby each blowing device may eject a material of a different specific gravity.

After the blowing operation is completed, the material rests in superposed loose layers on the floor of the chamber and forms a felt-like mass. Now the air of the chamber may be evacuated, whereupon the material on the floor of the chamber settles down, then the material is prepressed. The plates thus produced are preferably placed on top of one another and subsequently subjected to a high hydraulic pressure and finally hardened as above described.

According to one mode of carrying the invention into effect, by way of example, 30 parts of slaked lime, 10 parts of silica in the form of kieselguhr and, if desired, a dye, are introduced one after the other into a mixing drum and thereupon there is added 20 parts of wood-meal and 20 parts of cellulose, the two latter substances being added in a moist condition. The mixture thus produced is allowed to stand for 24 hours and thereupon it is introduced into moulds. It is hydraulically pressed and is subjected for at least 10 hours to a temperature which is gradually increased to 110° C. in drying chambers. Thereupon carbonic acid is introduced into the drying chambers.

The time required for the absorption of the carbonic acid varies according to the thickness of the plates. It takes about 2–3 days in the case of plates which are 5 mm. thick. The weight of the plate is thereby increased by about 10%.

It has already been proposed to produce slabs of artificial stone from fibrous materials by the admixture of water-glass and sometimes also of lime. However, when water-glass is used, clumps are produced, so that the products which are obtained in the mixing drum are not homogeneous. Moreover, these products are not constant but change when under the action of water, owing to the washing out of the soda which is formed and they are not capable of being treated with dilute mordant solutions as is the case with the products according to the present invention.

What I claim is:—

1. A process of producing artificial wood composed of layers differing from one another in specific gravity and structure, consisting in preparing different mixtures of pulverulent lime, pulverulent silica and organic fibrous material such as cellulose, wood-meal, wood-dust, moistening the mixture with such small quantities of water that it remains loose and felt-like, blowing the mixtures thus obtained into a chamber alternately and allowing them to settle down in superposed layers in the chamber, and subsequently compressing and hardening the material.

2. A process of producing artificial wood composed of layers differing from one another in specific gravity and structure, consisting in preparing mixtures of pulverulent lime, pulverulent silica and fibrous materials such as cellulose, wood-meal, wood-dust, the said mixtures differing from one another in specific gravity, and being in a felt-like and loosened condition, moistening the mixture with such small quantities of water that it remains loose and felt-like, blowing the mixtures thus obtained into a chamber alternately and allowing them to settle down in superposed layers in the chamber, and subsequently compressing and hardening the material.

3. A process of producing artificial wood composed of layers differing from one another in specific gravity and structure, consisting in preparing different mixtures of pulverulent lime, pulverulent silica and fibrous materials such as cellulose, wood-meal, wood-dust, moistening the mixture with such small quantities of water that it remains loose and felt-like, blowing the mixtures thus obtained into a chamber alternately and allowing them to settle down in superposed layers in the chamber, pressing the material, heating the pressed material, and subsequently treating the material with gaseous carbonic acid.

4. A process of producing artificial wood composed of layers differing from one another in specific gravity and structure, consisting in preparing different mixtures of pulverulent lime, pulverulent silica and fibrous materials such as cellulose, wood-meal, wood-dust, moistening the mixture with such small quantities of water that it remains loose and felt-like, blowing the mixtures thus obtained into a chamber alternately and allowing them to settle down in superposed layers in the chamber, evacuating the air from the chamber containing the superposed layers of material, applying a preliminary moderate pressure to the material, subsequently subjecting the material to a high pressure, and finally hardening the material.

5. A process of producing artificial wood composed of layers differing from one another in specific gravity and structure, consisting in preparing mixtures of pulverulent lime, pulverulent silica and fibrous materials such as cellulose, wood-meal, wood-dust, the said mixtures differing from one another in specific gravity, and being in a felt-like and loosened condition, moistening the mixture with such small quantities of water that it remains loose and felt-like, blowing the mixtures thus obtained into a chamber alternately and allowing them to settle down in superposed layers in the chamber, evacuating the air from the chamber containing the superposed layers of material, applying a preliminary moderate pressure to the material, subsequently subjecting the material to a high pressure, and finally hardening the material.

6. A process of producing artificial wood composed of layers differing from one another in specific gravity and structure, consisting in preparing different mixtures of pulverulent lime, pulverulent silica and fibrous materials such as cellulose, wood-meal, wood-dust, moistening the mixture with such small quantities of water that it remains loose and felt-like, blowing the mixtures thus obtained into a chamber alternately and allowing them to settle down in superposed layers in the chamber, heating the pressed material, and subsequently treating the material with gaseous carbonic acid.

7. A process of producing artificial wood composed of layers, consisting in preparing a mixture of pulverulent lime, pulverulent silica and fibrous materials such as cellulose, wood-meal, wood-dust, moistening the mixture with such small qauntities of water that it remains loose and felt-like, blowing the mixture thus obtained into a chamber, and allowing it to settle down in superposed layers in the chamber, pressing the material, heating the pressed material, and subsequently treating the material with gaseous carbonic acid.

STEFAN SCHLESS.